United States Patent [19]

Orland et al.

[11] Patent Number: 4,963,967
[45] Date of Patent: Oct. 16, 1990

[54] TIMING AUDIO AND VIDEO SIGNALS WITH COINCIDENTAL MARKERS

[75] Inventors: Steven Orland, Studio City, Calif.; Robert W. Parish, Gaston, Oreg.

[73] Assignees: Tektronix, Inc., Beaverton, Oreg.; National Broadcasting Company, Inc., Burbank, Calif.

[21] Appl. No.: 322,396

[22] Filed: Mar. 10, 1989

[51] Int. Cl.$^5$ .................. H04N 7/04; H04N 5/04
[52] U.S. Cl. ........................ 358/143; 358/148; 358/149
[58] Field of Search .......... 358/142, 143, 144, 145, 358/146, 148, 149, 198, 337, 320, 339; 360/36.1, 36.2

[56] References Cited

U.S. PATENT DOCUMENTS

| | | | |
|---|---|---|---|
| 4,218,705 | 8/1980 | Inaba et al. | 358/149 |
| 4,258,385 | 3/1981 | Greenberg et al. | 358/22 |
| 4,313,135 | 1/1982 | Cooper | 358/149 |
| 4,618,890 | 10/1986 | Kouyama et al. | 358/149 |
| 4,644,400 | 2/1987 | Kouyama et al. | 358/149 |
| 4,703,355 | 10/1987 | Cooper | 358/149 |
| 4,851,909 | 7/1989 | Noske et al. | 358/149 |

FOREIGN PATENT DOCUMENTS 229589  11/1985  Japan ........................... 358/148

Primary Examiner—John W. Shepperd
Assistant Examiner—Michael D. Parker
Attorney, Agent, or Firm—Francis I. Gray

[57] ABSTRACT

A method for timing audio and video component signals of a television signal with coincidental markers generates a field pulse every Nth field of the televison signal at the transmitter. The duration of the field pulse is approximately one video field, and is used to enable an audio tone generator for the one video field and to switch a distinctive video signal, such as a flat video signal, into the video component signal for the one video field. At the receiver the two component signals are input through a synchronizer to a waveform display device, such as an oscilloscope, to observe the time differential between the two markers in the audio and video component signals. The audio component signal is delayed by the synchronizer until the markers are again in time conicidence as at the transmitter.

5 Claims, 3 Drawing Sheets

TIMING AUDIO AND VIDEO SIGNALS WITH COINCIDENTAL MARKERS

BACKGROUND OF THE INVENTION

The present invention relates to signal timing, and more particularly to the timing of related audio and video signals with coincidental markers where the two signals travel over different transmission paths.

A television signal has both video and audio components that are related in time. If the two components get out of sync, the familiar "lip sync" problem can occur where events occur in the video portion of a television scene either before or after the corresponding sound. This problem can be caused just because the video and audio components are processed differently. For example the video may be delayed more than the audio with a video frame synchronizer that synchronizes the video to a reference timing signal that is used throughout the studio and with processing of the video to produce special effects. However such video delays with the studio can be determined with an audio synchronizer by comparing the video before processing with the video after processing and delaying the audio for the difference in time.

Of greater significance are delays caused by differences in transmission paths. Generally the video and audio components may be transmitted over different paths, such as the video component being transmitted via satellite from a transmitter to a receiver while the audio component is transmitted via land lines or microwave repeaters on the earth's surface. The result is that the video component travels a much greater distance than the audio component, resulting in delay differences of several video fields. This delay causes a "lip sync" problem where the audio is heard before the corresponding video occurs. Since the delay difference between the audio and video components did not occur within the studio, there is no reference signal with which to synchronize the two components. Thus there is no way to determine the amount of the delay difference between the two paths.

Therefore what is desired is a method for reliably timing the audio and video components at the ends of the respective transmission paths to bring the two components back into time coincidence.

SUMMARY OF THE INVENTION

Accordingly the present invention provides a method of timing audio and video signals with coincidental markers that can be displayed simultaneously on a display device at the end of the respective transmission paths. A test signal generator provides every N fields a video marker, such as a flat field, for the entire field as well as switching on an audio tone signal during that same field. The display device, such as an oscilloscope, triggers on the audio tone signal and has a time base sufficient to display at least N fields of the video signal so that the delay between the audio and video signals is readily apparent. Means for delaying the audio signal, such as a synchronizer, is provided in the audio signal path at the input to the display device to bring the audio tone signal and video marker signal into time coincidence, thus resynchronizing the audio and video signals.

The objects, advantages and other novel features of the present invention are apparent from the following detailed description when read in conjunction with the appended claims and attached drawing.

DESCRIPTION OF THE PREFERRED EMBODIMENT

Figure 1:
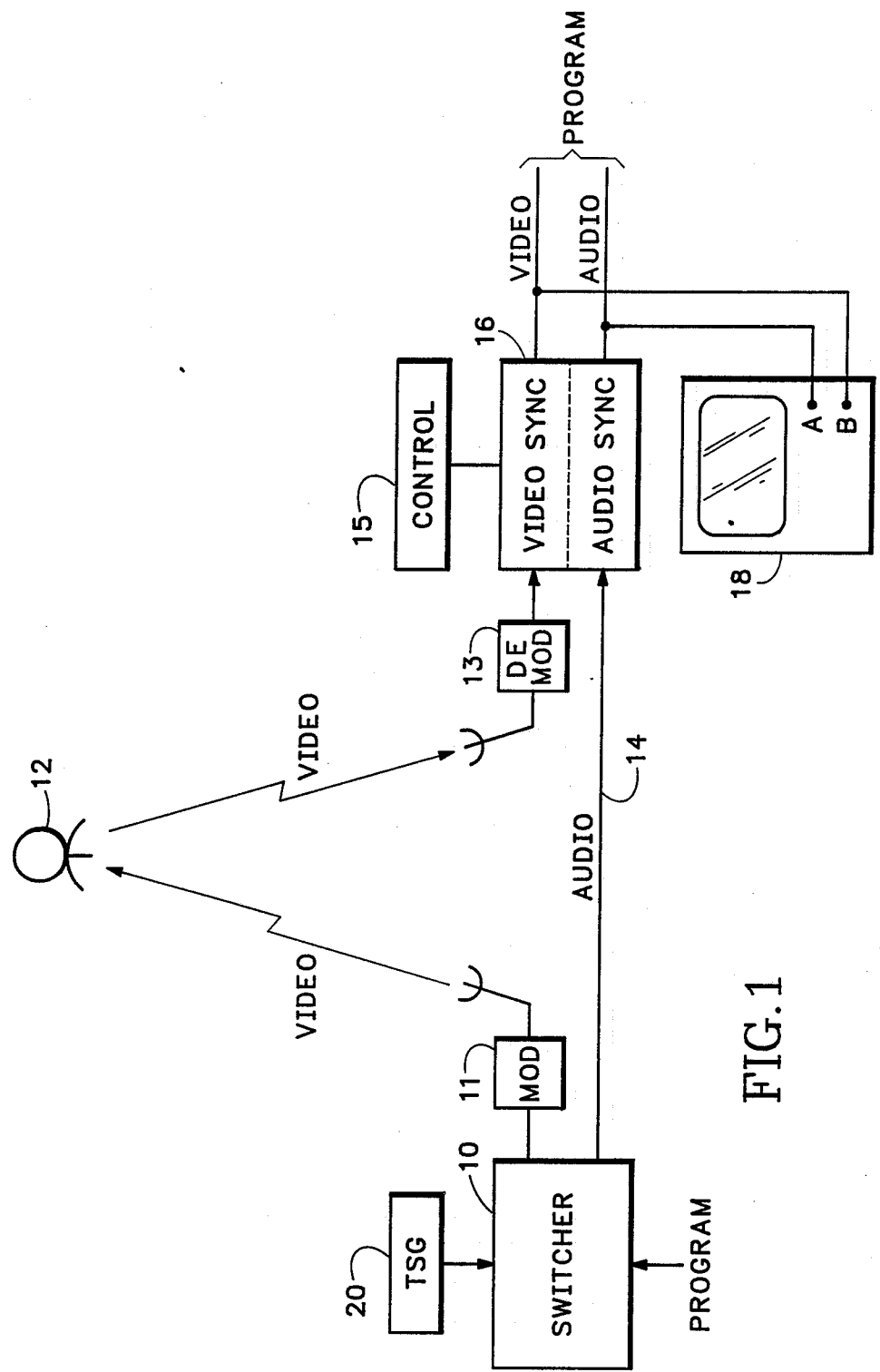
FIG. 1 is a block diagram of a transmission path for a television signal where the video and audio portions of the television signal have different transmission path lengths.

Referring now to FIG. 1 a switcher 10 has as inputs either program material or a test signal from a test signal generator 20 and outputs a television signal having a video and an audio component. The test signal has coincidental markers for the video and audio components. The video component is modulated by a modulator 11 and transmitted over one transmission path, such as via a satellite 12, while the audio component is transmitted over a different transmission path, such as via a landline 14. The video component is demodulated by a demodulator 13 at the receiving site and is input together with the audio component to a synchronizer 16 having both a video synchronizer and an audio synchronizer. The resulting video and audio waveforms from the synchronizer 16 are displayed on an appropriate waveform monitor, such as an oscilloscope 18. An operator via a control interface 15, by observing the video and audio components on the oscilloscope during the time when the transmitted television signal is generated by the test signal generator 20, may adjust the audio component delay introduced by the audio portion of the synchronizer 16 until the coincidental markers transmitted on each component are in time coincidence. Likewise if the audio component travels over the longer path, then the video delay is adjusted. Although a manual adjustment is described, an automatic adjustment may also be made by detecting the markers and generating delay signals to automatically delay the appropriate component. In the automatic situation the oscilloscope 18 and the control interface 15 are replaced by a microprocessor and appropriate detection circuitry, as is well known in the art.

Figure 2:
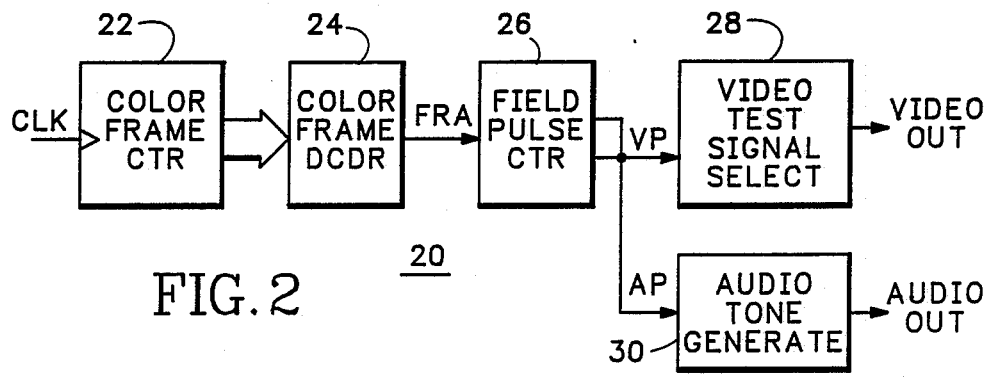
FIG. 2 is a block diagram of a portion of a test signal generator for generating coincidental markers for time synchronization between video and audio portions of a television signal according to the present invention.

As shown in FIG. 2 the test signal generator 20 has a color frame counter 22 that counts a clock signal input, the clock signal being synchronized with a master television sync signal, to produce an output count that is decoded by a decoder 24. Every n fields of the video signal the decoder 24 outputs a field reference pulse (FRA) that is input to a field pulse counter 26. The field pulse counter 26 outputs a full field pulse every Nth field for each component of the television signal, where N is an integer multiple of the number of fields that make up a video color frame. The field pulse is applied to respective video and audio test signal generators 28, 30 to generate a distinctive video signal, such as a video flat signal, for one field and a time coincident audio tone signal. The video test signal generator 28 is a signal selection circuit that generates a predetermined signal according to an operator selection, such as color bars or the like. The field pulse interrupts the selected predetermined signal from the test signal generator 28 to output the distinctive video signal for one field every Nth field. Likewise the audio test signal generator 30 is disabled except when the field pulse is applied, at which time a predetermined audio tone is output for the duration of one video field.

Figure 3:
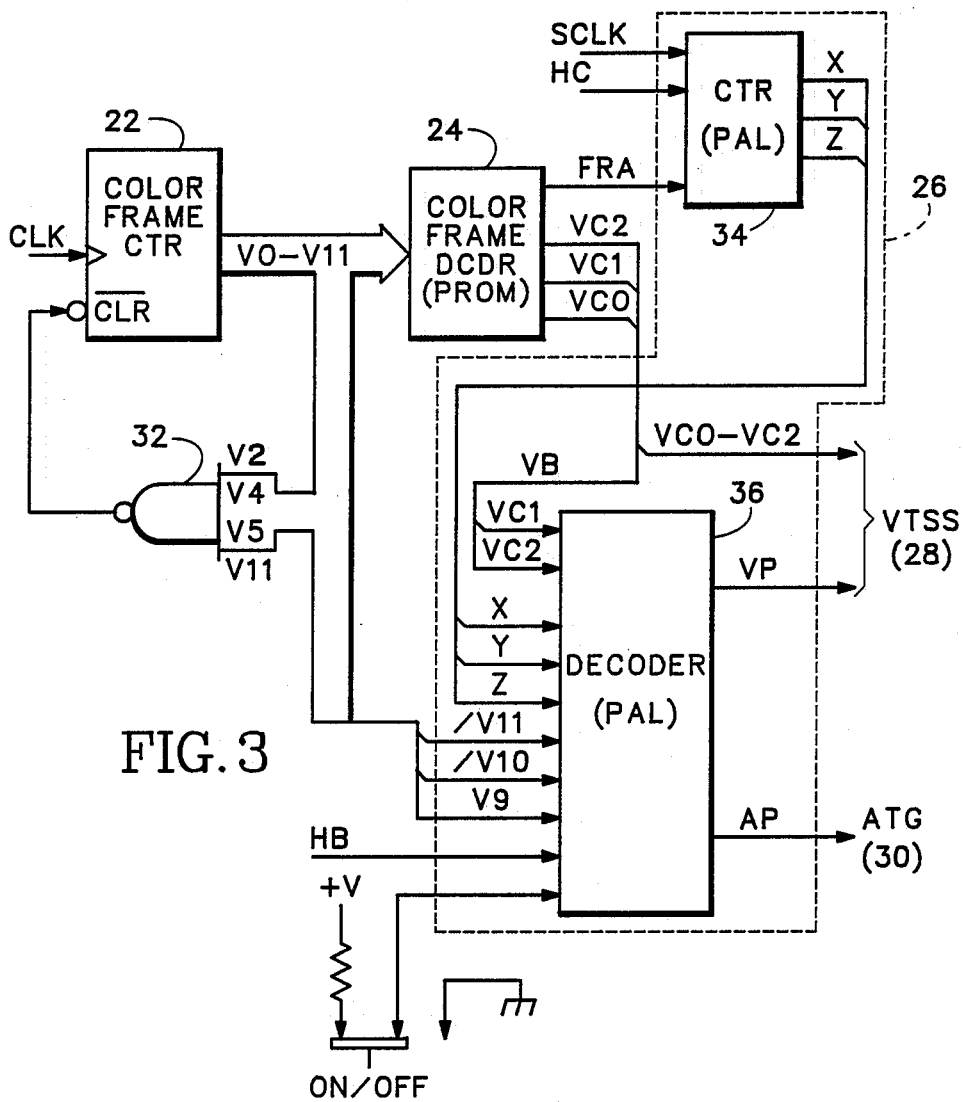
FIG. 3 is a schematic diagram of the test signal generator of FIG. 2 for generating coincidental markers to the present invention.

As shown in greater detail in FIG. 3 the clock signal input may be at twice the horizontal line rate so that two pulses occur for each horizontal line. For NTSC four fields, or two frames of 525 lines each, make up a complete video color frame, whereas for PAL eight fields, or four frames of 625 lines each, make up a complete video color frame. In an NTSC test signal generator the color frame counter 22 is a four field counter that is clocked at twice the horizontal line rate. At the end of four fields the output of the four field counter 22 is 2100, i.e., outputs V2, V4, V5 and V11 are high, and the four field counter is reset by the output of a NAND gate 32. The output of the four field counter 22 is input as an address to the color frame decoder 24, which may be a PROM. At every fourth field at line 11, i.e., after the vertical blanking interval, the color frame decoder 24 outputs the field reference pulse FRA for the duration of that line. Additional vertical count pulses VC0, VC1 and VC2 also are output to indicate timing during the vertical blanking interval. The total vertical blanking interval is indicated when both VC1 and VC2 are low.

FRA pulse is applied to one enable input of a three-bit binary counter 34 and a horizontal counter clear pulse HC having a duration of one sample clock interval, approximately 70 usec for NTSC, is applied to another enable input of the counter. The HC pulse occurs during the FRA pulse so that once every four fields the sample clock SCLK increments the counter 34, the sample clock for NTSC having a frequency of approximately 14.3 MHz or four times the color subcarrier frequency equivalent to 910 samples per line. The outputs X, Y, Z from the counter 34 repeat their configuration every eight counts or thirty-two fields for NTSC. A decoder 36 detects the eighth count from the counter 34 and generates the audio pulse AP to the audio tone generator 30 for the duration of one video field, or for 512 counts of the four field counter 22 which approximates one field, i.e., V9 high while V10 and V11 are low. The decoder 36 also generates the video pulse VP that is applied to the test signal selector 28 to interrupt the standard test signal and insert the distinctive video signal, such as a white or a black flat signal, for the entire field less the vertical blanking interval as determined by VC1 and VC2 and the horizontal blanking interval as determined by a horizontal blanking pulse HB also input to the decoder in order to maintain video synchronization.

Figure 4:
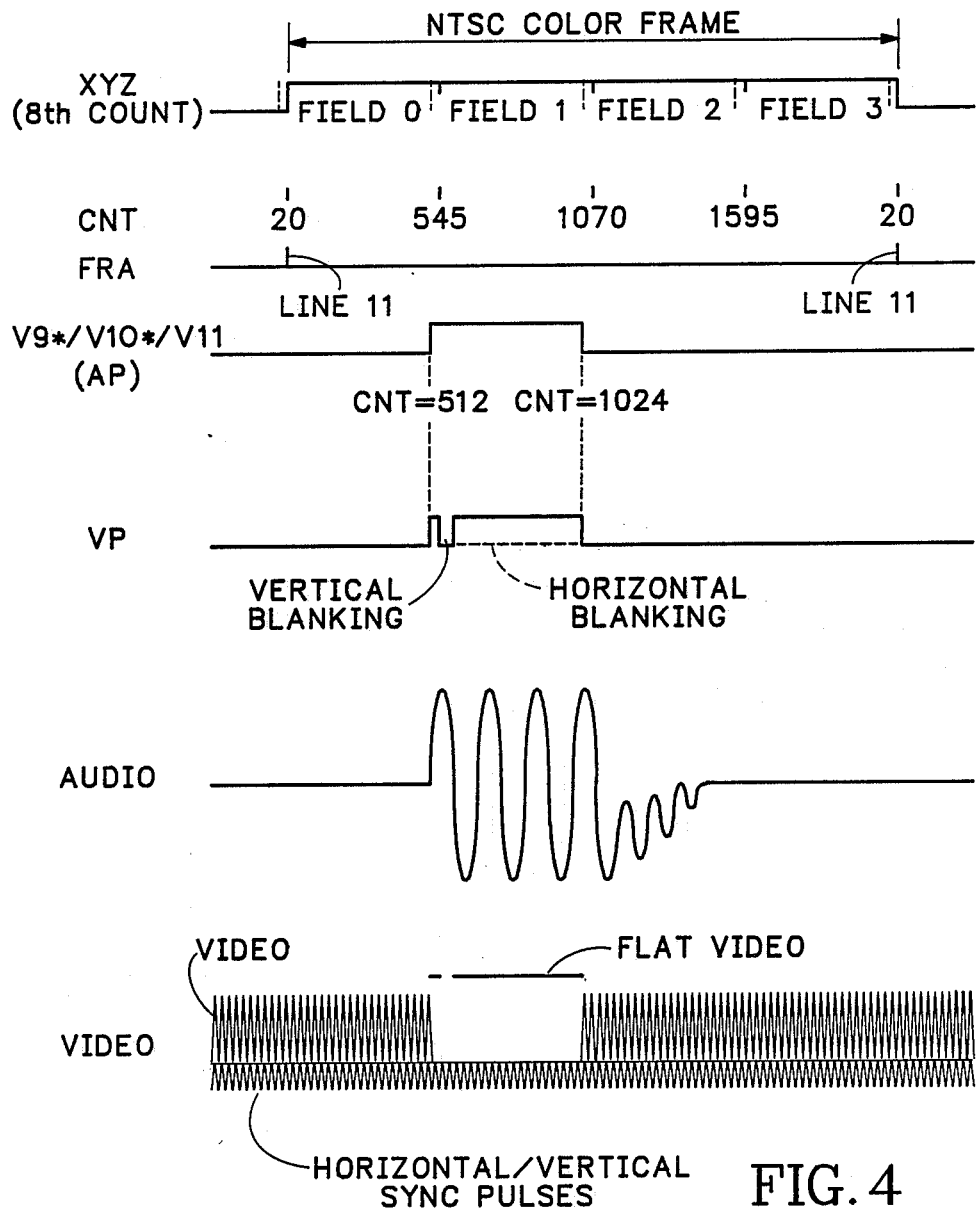
FIG. 4 is a waveform view of the coincidental markers generated according to the present invention.

With reference to FIG. 4 when the XYZ output of the binary counter 34 indicates the eighth count corresponding to the thirty-second field, the decoder 36 is enabled for a four field duration. The four field counter 22 starts its count at the beginning of the four field interval and when the count reaches 512 the decoder 36 outputs the AP pulse until the count reaches 1024, approximately one field in duration, resulting in an audio tone signal for that duration. Likewise the decoder 36 outputs the VP pulse at the same time, the VP pulse being high except during the vertical and horizontal blanking intervals. The resulting video signal shows an interruption during that approximately one field interval in the form of a video flat field, such as white. Therefore when the video and audio are displayed on a common waveform display device, such as the oscilloscope 18, any delay of one field or greater is readily apparent, and by delaying the audio component the audio and video components of the television signal may be brought back into time synchronization to compensate for the transmission path differential.

Thus the present invention provides a method of compensating for differential path delays between the audio and video components of a television signal by providing a coincidental marker in both components at the transmitter end so that an appropriate delay can be set at the receiver end to bring the components into time coincides at the receiver to eliminate "lip sync" anomalies.

What is claimed is:

1. A method of timing the audio and video components of a television signal that are transmitted from a transmitter to a receiver over different paths comprising the steps of:
    periodically generating a distinctive video signal and an audio tone signal in time coincidence as coincidental markers for insertion into the respective components for transmission by the transmitter over the different paths;
    displaying the audio and video components at the receiver as waveforms on a display device;
    observing on the display device a time delay difference between the respective coincidental markers of the components; and
    delaying one of the components at the receiver by an amount equal to the time delay difference so that the coincidental markers are in time coincidence.

2. An apparatus for generating coincidental markers at a transmitter for timing of the audio and video portions of a television signal at a receiver comprising:
    means for generating a periodic reference pulse;
    means for generating from the periodic reference pulse an audio pulse and a video pulse in time coincidence; and
    means for generating an audio tone signal in response to the audio pulse and a distinctive video signal in response to the video pulse as coincidental markers.

3. An apparatus as recited in claim 2 wherein the periodic reference pulse generating means comprises:
    a color frame counter that is incremented by a clock synchronized to a master sync signal of the television signal and is reset at the end of a video color frame of the television signal; and
    means for generating the periodic reference pulse from the count output of the color frame counter once per color frame.

4. An apparatus as recited in claim 3 wherein the audio and video pulse generating means comprises:
    a binary counter for counting the periodic reference pulses from the periodic reference pulse generating means; and
    a decoder, having as inputs the count of the binary counter and the count of the color frame counter, to output the audio and video pulses for a duration of one video field of the television signal each time the count of the binary counter reaches a predetermined value so that the audio and video pulses occur in time coincidence once every Nth video field.

5. An apparatus as recited in claim 2 further comprising:
    means at the receiver for detecting a time delay difference between the audio tone signal and the distinctive video signal; and
    means for delaying one of the components according to the time delay difference.

* * * * *